July 2, 1957  J. J. N. VAN AMSTEL  2,797,416
FLY FOR AN ARTICLE OF DRESS
Filed Jan. 19, 1955  2 Sheets-Sheet 1
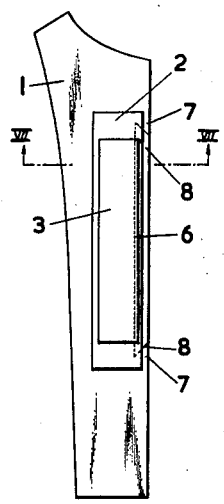
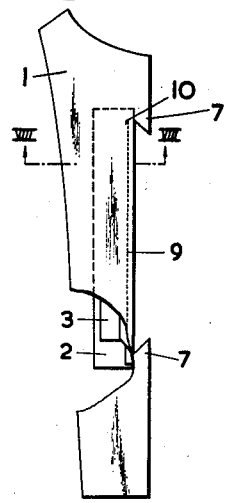
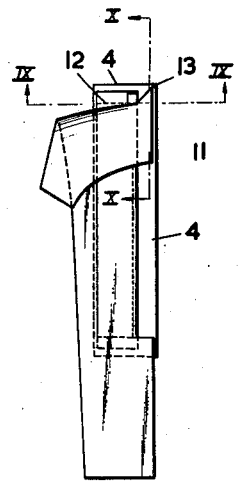
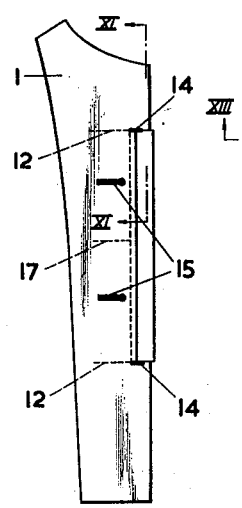
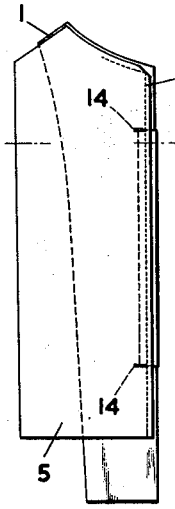
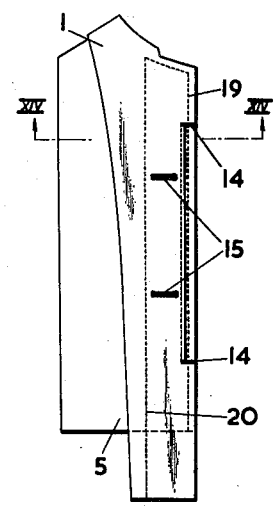

July 2, 1957 — J. J. N. VAN AMSTEL — 2,797,416
FLY FOR AN ARTICLE OF DRESS
Filed Jan. 19, 1955 — 2 Sheets-Sheet 2
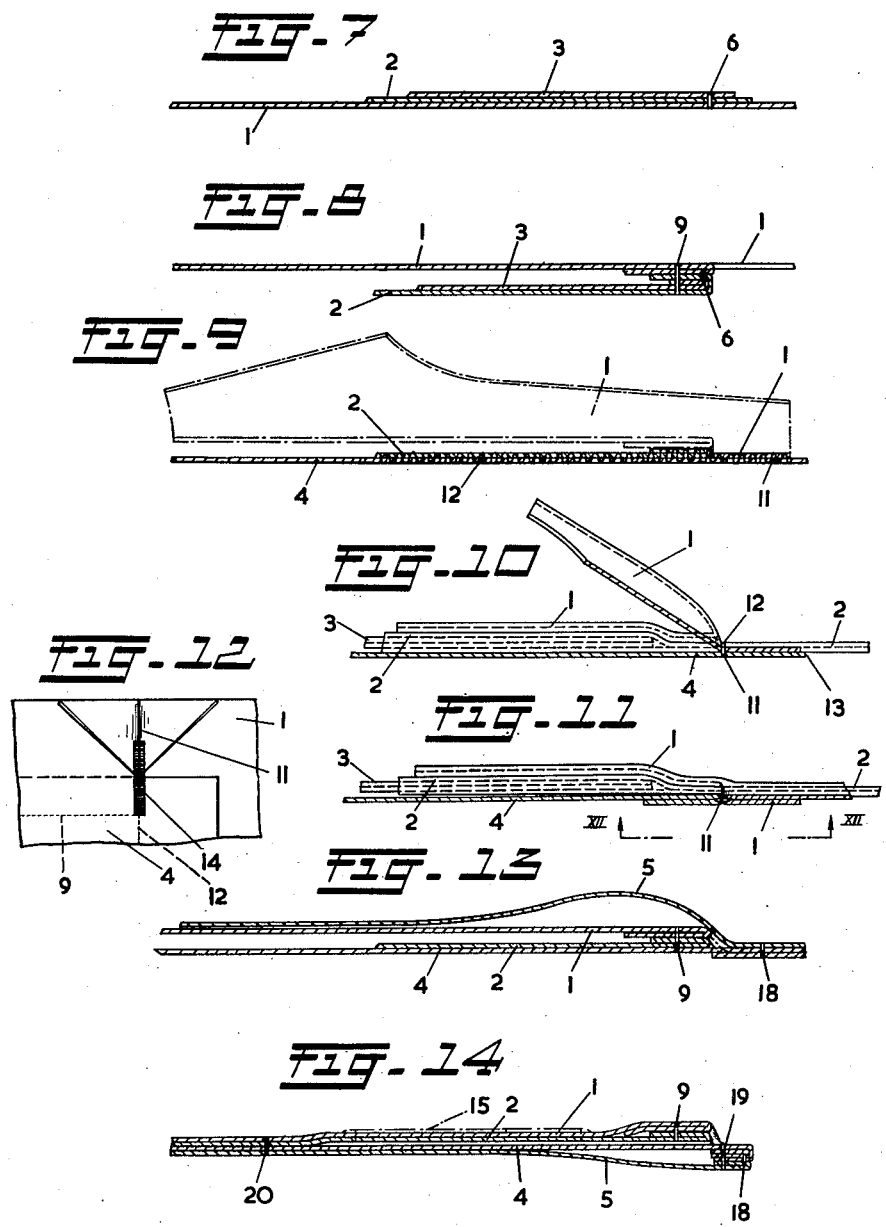

United States Patent Office 2,797,416
Patented July 2, 1957

2,797,416

FLY FOR AN ARTICLE OF DRESS

Josephus J. N. Van Amstel, Amsterdam, Netherlands, assignor to Hollandia Kattenburg N. V., Amsterdam, Netherlands, a corporation of the Netherlands Application January 19, 1955, Serial No. 482,846

10 Claims. (Cl. 2—96)

This invention relates to a fly for an article of dress. In conventional flies the front edge of the fly strip, which strip is provided with buttonholes or other fastening means (hereinafter called: buttonhole fly strip) and which is located behind the front panel, is flush with the front edge of said front panel.

At the ends of the fly the said two front edges when stitched together will form one front edge. This means that adjacent the stitchings there will be double the amount of material and two superposed front edges. Owing thereto the fly is always visible, while rapidly and correctly joining the said front edges at the ends of the fly is not possible mechanically. The upper and lower stitchings must be made by hand.

When an article of dress provided with the conventional fly has been worn for some time the front edge of the buttonhole fly strip will start protruding beyond the front edge of the front panel owing to the forces exerted on the buttonholes or other fastening means.

The object of the present invention is to eliminate the above-mentioned drawbacks and at the same time to render it possible to completely finish the fly mechanically.

According to the invention the front edge of the buttonhole fly strip is so disposed that it is concealed by the front edge of the front panel.

The front edge of the button hole fly strip is preferably so disposed as to be located behind the marginal top stitching line provided in the front panel.

The invention will now be described in detail with reference to the accompanying drawing showing an embodiment of the fly according to the invention, while at the same time the successive steps of manufacturing said fly will be elucidated.

In said drawing:

Fig. 1 shows the manner in which a fly lining and an intermediate layer are sewn to the buttonhole fly strip;

Fig. 2 shows the manner in which the buttonhole fly strip and the fly lining are stitched together;

Fig. 3 shows the manner in which a counter fly is sttiched to the buttonhole fly strip, the seams formed running transversely of the fly;

Fig. 4 shows the manner in which the buttonholes and the transverse end and intermediate bar tacks are provided;

Fig. 5 shows the manner in which the buttonhole fly part is stitched onto the front panel and how it is cut;

Fig. 6 shows the manner in which, after turning the fly part about the stitching line connecting it with the front panel, the finishing top stitchings are provided.

Fig. 7 is a cross-section on line VII—VII in Fig. 1;
Fig. 8 is a cross-section on line VIII—VIII in Fig. 2;
Fig. 9 is a cross-section on line IX—IX in Fig. 3;
Fig. 10 is a cross-section on line X—X in Fig. 3;
Fig. 11 is a cross-section on line XI—XI in Fig. 4;
Fig. 12 is a cross-section on line XII—XII in Fig. 11;
Fig. 13 is a cross-section on line XIII—XIII in Fig. 5;
Fig. 14 is a cross-section on line XIV—XIV in Fig. 6.

Exclusively by way of example the drawing shows the building up of a fly for a raincoat, which fly is manufactured according to the invention and which comprises the following pieces of material: a buttonhole fly strip 1, a fly lining 2, a linen intermediate layer 3, a counterfly 4 and a front panel 5.

The various pieces of material are cut to the desired size and provided with marking notches.

On the buttonhole fly strip 1 the fly lining 2 is placed so that the right sides face each other, the intermediate layer 3 being placed on the fly lining. These three pieces are stitched together, the fly stitching line formed being designated by the reference numeral 6, which line extends between the two marks 7 provided on the buttonhole fly strip in the cutting department. The distance from the stitching line 6 to the edge of the buttonhole fly strip 1 is about twice as large as the distance from said line 6 to the edge of the fly lining 2.

Subsequently oblique slits 8 are cut into the buttonhole fly strip 1, which slits run from points located between the marks 7 to the ends of the stitching line 6. The fly lining 2 is then folded about the stitching line 6 and pressed, so that a front edge seam is formed. The whole is then stitched through again along a marginal fly stitching line 9, whose tacked ends 10 are on a level with the marks 7.

With its right side facing in the same direction as the right side of the buttonhole fly strip 1 a counterfly 4 is now placed below the whole formed, said counterfly extending beyond the marks 7 adjacent the stitching lines 6 and 9. The ends of the button hole fly strip 1 are turned back and the cross seams 11 are provided from the marginal marks 7 to the ends 10 of the stitching line 9 between the right sides of the buttonhole fly strip 1 and the counterfly 4. Said seams 11 merge into seams 12 by means of which the fly lining 2 and the counterfly 4 are secured together it being recalled that the fly lining 2 is joined with the fly strip 1 and the intermediate layer 3 by the stitching line 6.

The counterfly 4 is subsequently provided with oblique cuts 13 extending up to the tacked ends 10 of the stitching line 9 and the oblique corner pieces are pressed open.

The end tack bars 14 are now mechanically provided in the fly part thus formed, which bars run from the stitching line 9 across the seam 6 to halfway the seam 11.

By means of a buttonhole machine the buttonholes 15 are worked in the fly part. Subsequently the intermediate tacks 17 are machine stitched between the counterfly 4, the fly lining 3 and the intermediate layer 2.

The completely finished fly part is now sewn to the front panel 5, the longitudinal front line of stitching being designated by 18. Said front stitching line exactly meets the end of the reinforcing stitching 14 and is parallel to the line of stitching 6. The distance from stitching line 18 to stitching line 6 preferably equals the distance from stitching line 6 to stitching line 9.

The edges protruding beyond the stitching line 18 are pressed and the fly part is folded over to lie upon the front panel 5 (thus folding under the right longitudinal edge of counterfly 4 as shown in Fig. 14) and is likewise pressed. The stitching line 18 is thus formed into the front edge seam running along the front panel of the raincoat. Subsequently the top marginal stitching line 19 is provided in the front panel 5 and the fly part, which adjacent the stitching line 6 is also stitched in the fixed counterfly but not in the fly lining 2, the intermediate layer 3 and the button hole fly strip 1.

Finally the front panel and the fly are top stitched, the common line of stitching 20 formed coupling all the five pieces of material at the rear of the fly and closing the openings between the intermediate tacks 17 and the seams 12.

If the edge of the buttonhole fly strip 1 is formed by another construction instead of by seaming to front panel 5 this does not make any essential difference as far as the invention is concerned because said other construction can only involve a substitution for the front edge seam of the button hole fly strip.

Not only can the fly according to the invention be completely manufactured mechanically, but in addition the various operations are greatly simplified because not all of the lines of stitching are bound to an exact length. In addition it is not necessary for lines of stitching to merge into each other as is the case at the ends of the conventional fly. The folding over, stitching and pressing operations are much easier and can be learned more quickly therefore. I have found that as compared with the manufacture of the conventional fly the manufacture of the fly according to the invention results in a saving of labour of about 25%.

I claim:

1. A fly in a garment, such as a coat, a cape and the like, said garment comprising a front panel made from at least one layer of fabric, a buttonhole fly strip connected to said front panel by means of a front stitching line, a counterfly extending the length of the fly and being likewise connected to said front panel by said front stitching line and to the button hole fly strip by means of a cross seam marking the end of the fly, a fly lining connected to the buttonhole fly by means of a fly stitching line running parallel to the front stitching line, said fly lining being coupled to the counterfly by a seam linking up with the cross-seam, the counterfly and the fly lining being coupled to each other by a common stitching line for closing the inner side of the fly, and buttonholes in the buttonhole fly strip and in the fly lining.

2. A fly in a garment, such as a coat, a cape and the like, said garment comprising a front panel made from at least one layer of fabric, a buttonhole fly strip connected to said front panel by means of a front stitching line, a counterfly extending the length of the fly and being likewise connected to said front panel by said front stitching line and to the buttonhole fly strip by means of a cross seam marking the end of the fly, a fly lining connected to the buttonhole fly by means of a fly stitching line running parallel to the front stitching line, said fly lining being coupled to the counterfly by a seam linking up with the cross-seam, the counterfly and the fly lining being coupled to each other by a common stitching line for closing the inner side of the fly, buttonholes in the buttonhole fly strip and in the fly lining, and intermediate tacks provided between said fly lining and the counterfly.

3. A fly in a garment, such as a coat, a cape and the like, said garment comprising a front panel made from at least one layer of fabric, a buttonhole fly strip connected to said front panel by means of a front stitching line, a counterfly extending the length of the fly and being likewise connected to said front panel by said front stitching line and to the buttonhole fly strip by means of a cross seam marking the end of the fly, a fly lining as well as an intermediate layer being connected to the buttonhole fly by means of a fly stitching line running parallel to the front stitching line, said fly lining being coupled to the counterfly by a seam linking up with the cross-seam, the counterfly, the intermediate layer and the fly lining being coupled to one another by a common stitching line for closing the inner side of the fly, and buttonholes in the buttonhole fly strip, in the intermediate layer and in the fly lining.

4. A fly in a garment, such as a coat, a cape and the like, said garment comprising a front panel made from at least one layer of fabric, a buttonhole fly strip connected to said front panel by means of a front stitching line, a counterfly extending the length of the fly and being likewise connected to said front panel by said front stitching line and to the buttonhole fly strip by means of a cross seam marking the end of the fly, a fly lining as well as an intermediate layer being connected to the buttonhole fly by means of a fly stitching line running parallel to the front stitching line, said fly lining being coupled to the counterfly by a seam linking up with the cross-seam, the counterfly, the intermediate layer and the fly lining being coupled to one another by a common stitching line for closing the inner side of the fly, buttonholes in the buttonhole fly strip, in the intermediate layer and in the fly lining, and intermediate tacks between said fly lining, the intermediate layer and the counterfly.

5. A fly in a garment, such as a coat, a cape and the like, said garment comprising a front panel made from at least one layer of fabric, a buttonhole fly strip being connected to said front panel by means of a front stitching line, a counterfly extending the length of the fly and being likewise connected to said front panel by said front stitching line and to the button hole fly strip by means of a cross-seam marking the end of the fly, a marginal stitching line forming an additional connection between the buttonhole fly strip, the counterfly and the front panel, a fly lining being connected to the buttonhole fly strip, by means of a fly stitching line running parallel to the front stitching line and by means of a marginal fly stitching line parallel to the fly stitching line, said fly lining being coupled to the counterfly by a seam linking up with the cross-seam, a reinforcing stitching for reinforcing the linking up ends of said seams being provided to extend from said front stitching line to said marginal fly stitching line between the buttonhole fly strip, the fly lining and the counterfly, said counterfly and the fly lining being coupled to each other by a common stitching line for closing the inner side of the fly, and buttonholes in the buttonhole fly strip and in the fly lining.

6. A fly in a garment, such as a coat, a cape and the like, said garment comprising a front panel made from at least one layer of fabric, a button hole fly strip connected to said front panel by means of a front stitching line, a counterfly extending the length of the fly and being likewise connected to said front panel by said front stitching line and to the button hole fly strip by means of a cross seam marking the end of the fly, a marginal stitching line forming an additional connection between the button hole fly strip, the counterfly and the front panel, a fly lining being connected to the buttonhole fly strip, by means of a fly stitching line running parallel to the front stitching line and by means of a marginal fly stitching line parallel to the fly stitching line, said fly lining being coupled to the counterfly by a seam linking up with the cross-seam, a reinforcing stitching for reinforcing the linking up ends of said seams being provided to extend from said front stitching line to said marginal fly stitching line between the button hole fly strip, the fly lining and the counterfly, said counterfly and the fly lining being coupled to each other by a common stitching line for closing the inner side of the fly, buttonholes in the buttonhole fly strip and in the fly lining, and intermediate tacks between said fly lining and the counter fly.

7. A fly in a garment, such as a coat, a cape and the like, said garment comprising a front panel made from at least one layer of fabric, a buttonhole fly strip being connected to said front panel by means of a front stitching line, a counterfly extending the length of the fly and being likewise connected to said front panel by said front stitching line and to the button hole fly strip by means of a cross seam marking the end of the fly, a marginal stitching line forming an additional connection between the button hole fly strip, the counterfly and the front panel, a fly lining as well as an intermediate layer connected to the button hole fly strip by means of a fly stitching line running parallel to the front stitching line and by means of a marginal fly stitching line parallel to the fly stitching line, said fly lining being coupled to the counter fly by a seam linking up with the cross seam, a reinforcing stitching for reinforcing the linking up ends of said seams and extending from said front stitching line to said marginal fly stitching line between the button hole fly strip, the fly lining and the counterfly, said counterfly, the fly lining, the button hole fly strip, the intermediate layer being coupled to one another by a common stitching line for closing the inner side of the fly, and button holes in the button hole fly strip, in the intermediate layer and in the fly lining.

8. A fly in a garment, such as a coat, a cape and the like, said garment comprising a front panel made from at least one layer of fabric, a buttonhole fly strip being connected to said front panel by means of a front stitching line, a counterfly extending the length of the fly and being likewise connected to said front panel by said front stitching line and to the button hole fly strip by means of a cross seam marking the end of the fly, a marginal stitching line forming an additional connection between the button hole fly strip, the counterfly and the front panel, a fly lining as well as an intermediate layer connected to the button hole fly strip by means of a fly stitching line running parallel to the front stitching line and by means of a marginal fly stitching line parallel to the fly stitching line, said fly lining being coupled to the counter fly by a seam linking up with the cross-seam, a reinforcing stitching for reinforcing the linking up ends of said seams and extending from said front stitching line to said marginal fly stitching line between the buttonhole fly strip, the fly lining and the counterfly, said counterfly, the fly lining, the buttonhole fly strip, the intermediate layer being coupled to one another by a common stitching line for closing the inner side of the fly, button holes in the button hole fly strip, in the intermediate layer and in the fly lining and intermediate tacks between said fly lining, the intermediate layer and the counterfly.

9. A fly in a garment, such as a coat, a cape and the like, said garment comprising a front panel made from at least one layer of fabric, a buttonhole fly strip being connected to said front panel by means of a front stitching line, a counterfly extending the length of the fly and being likewise connected to said front panel by said front stitching line and to the button hole fly strip by means of a cross seam marking the end of the fly, a marginal stitching line forming an additional connection between the button hole fly strip, the counterfly and the front panel, a fly lining as well as an intermediate layer connected to the buttonhole fly strip by means of a fly stitching line running parallel to the front stitching line and by means of a marginal fly stitching line and said fly stitching line being equal to the space between said front stitching line and said marginal stitching line, said fly lining and the intermediate layer being coupled to the counterfly by a seam linking up with the cross-seam, a reinforcing stitching for reinforcing the linking up ends of the said seams extending from said front stitching line to said marginal fly stitching line between the buttonhole fly strip, the fly lining and the counterfly, said counterfly, the fly lining and the intermediate layer being coupled with one another and with the button hole fly strip and the front panel by a common stitching line for closing the inner side of the fly, said common stitching line being parallel to the other parallel stitching lines, and button holes in the button hole fly strip, in the intermediate layer and in the fly lining.

10. A fly in a garment, such as a coat, a cape and the like, said garment comprising a front panel made from at least one layer of fabric, a button hole fly strip being connected to said front panel by means of a front stitching line, a counter fly extending the length of the fly and being likewise connected to said front panel by said front stitching line and to the button hole fly strip by means of a cross seam marking the end of the fly, a marginal stitching line forming an additional connection between the button hole fly strip, the counterfly and the front panel, a fly lining as well as an intermediate layer being connected to the buttonhole fly strip by means of a fly stitching line running parallel to the front stitching line and by means of a marginal fly stitching line, the space between said marginal fly stitching line and said fly stitching line being equal to the space between said front stitching line and said marginal stitching line, said fly lining and the intermediate layer being coupled to the counter fly by a seam linking up with the cross seam, a reinforcing stitching for reinforcing the linking up ends of the said seams and extending from said front stitching line to said marginal fly stitching line between the buttonhole fly strip, the fly lining and the counterfly, said counterfly, the fly lining and the intermediate layer being coupled with one another and with the buttonhole fly strip and the front panel by a common stitching line for closing the inner side of the fly, said common stitching line being parallel to the other parallel stitching lines, button holes in the button hole fly strip, in the intermediate layer and in the fly lining and intermediate tacks between said fly lining, the intermediate layer and the counter fly.

References Cited in the file of this patent

UNITED STATES PATENTS

| 2,672,615 | Itri | Mar. 23, 1954 |

FOREIGN PATENTS

| 140,991 | Great Britain | Apr. 8, 1920 |